Dec. 6, 1960    V. L. WOODARD    2,963,074
DRIVER'S SEAT
Filed July 20, 1959    2 Sheets-Sheet 1
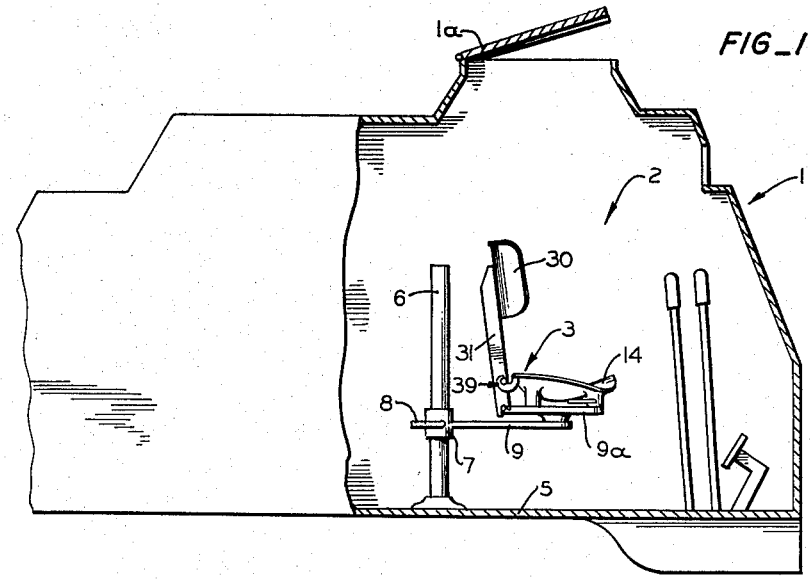
FIG_1
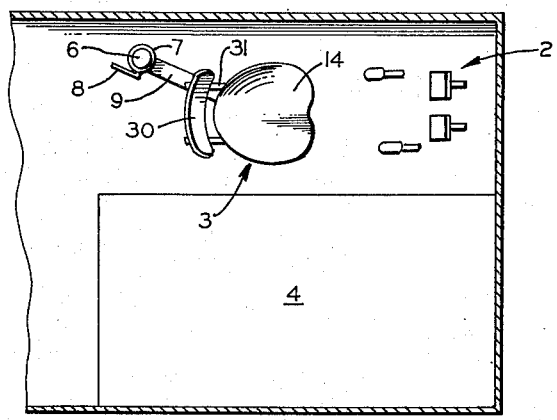
FIG_2
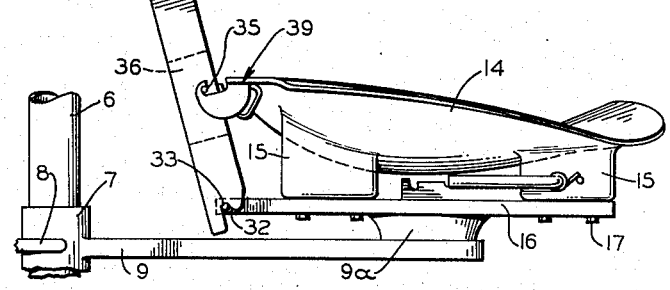
FIG_3
INVENTOR.
VERNON L. WOODARD
BY
ATTORNEYS Dec. 6, 1960 V. L. WOODARD 2,963,074
DRIVER'S SEAT
Filed July 20, 1959 2 Sheets-Sheet 2
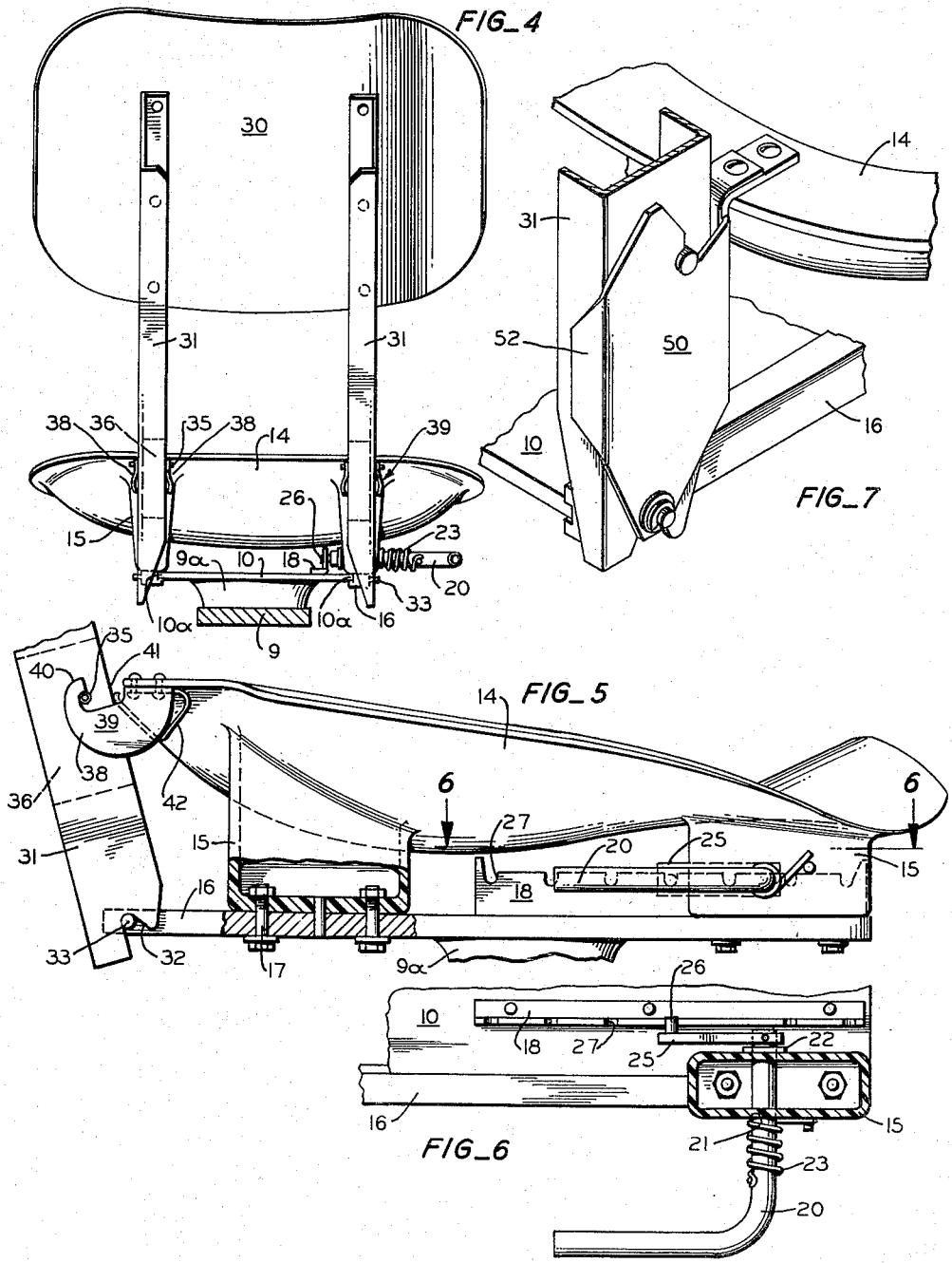
INVENTOR.
VERNON L. WOODARD
BY
ATTORNEYS United States Patent Office 2,963,074
Patented Dec. 6, 1960

2,963,074

DRIVER'S SEAT

Vernon L. Woodard, Palo Alto, Calif., assignor to Hiller Aircraft Corporation, Palo Alto, Calif., a corporation of California Filed July 20, 1959, Ser. No. 828,113

6 Claims. (Cl. 155—5)

This invention relates to a driver's seat and, more particularly, to an adjustable seat adaptable for use in military tanks, in airplanes and in other vehicles and installations wherein space and accessibility are critical considerations.

Partially because of the trend toward equipping military tanks and similar vehicles with more and larger instruments, machinery and armament in the limited space available, the problem of accommodating a pilot and screw comfortably has become increasingly acute. Moreover, the accessibility of the seat is frequently a particular problem since it is often necessary to reach the seat from a restricted passageway extending rearward thereof with little or no space available for passing around the seat. Consequently, there are further demands for a driver's seat in vehicles having confined quarters, which seat is both comfortable and accessible.

It is, therefore, an object of this invention to provide a pilot's seat that is comfortable and adjustable vertically and horizontally.

It is a further object of this invention to provide a pilot's seat that is completely collapsible to increase the accessibility thereof.

It is a further object of this invention to provide a pilot's seat that can be manufactured economically.

A pilot's seat embodying features of this invention should include a molded contour seat slidably carried on a platform which is adjustable in height. Cooperating force and aft guide-ways restrict the sliding movement of the seat, and a lock member is provided to fix the seat in any selected position. The base of the back rest is fulcrumed to a pivot point on the seat assembly so that it can be pivoted thereon and selectively completely separated therefrom. A releasable spring biased latch prevents lateral movement of the back rest and holds it in proper association with the seat for normal use, but is releasable in response to a forward and upward force against the back rest to render the back rest removable and thus facilitate entry and removal from the chair.

Other objects and advantages of this invention will become apparent from the specification following when read in connection with the accompanying drawings wherein:

Fig. 1 is a schematic view of a military tank provided with the chair of this invention;

Fig. 2 is a schematic horizontal section of the military tank;

Fig. 3 is a side elevation of the chair;

Fig. 4 is a back view of the chair;

Fig. 5 is a side view in partial section of the seat portion of the chair showing the latch means by which the back rest is installed;

Fig. 6 is a view in partial section taken along line 6—6 of Fig. 5, and

Fig. 7 is a partial isometric view of another embodiment of the chair of this invention.

Referring now to the drawings, there is shown merely for purposes of illustration, a schematic representation of a military tank 1 with a confined driver's compartment 2 wherein the chair 3 of this invention is installed. Placement of the engine compartment 4 in the forward portion of the tank leaves a very restricted driver's compartment which can be reached only by dropping down from the hatch 1a or by moving forwardly from the rearward portions of the tank 1. When moving forward or rearward there is no room to pass around the chair 3. The means for rendering the chair accessible from the rear is a significant feature of this invention.

The chair 3 is installed by bolting or otherwise securing to the framework or floor plate 5 of the driver's compartment a supporting post 6 slidably carrying a sleeve 7 with suitable detent means controlled by a handle 8 for adjustably fixing the height of the sleeve 7 along the post 6. Preferably, the sleeve is rotatable on the post to permit some variable positioning of the arm 9 which is secured to and carried by the sleeve 7. In turn, carried on the support arm 9 is a rectangular base plate 10 (Fig. 4) supporting a contour seat 14. If desired a swivel 9a may be provided on the support arm 9 to permit the contour seat 14 to be revolved. The seat 14 is slidably supported on the base plate 10 by four feet 15 depending from the bottom thereof. The feet 15 are formed of a material having a low coefficient of friction which permit the seat to slide across the metal base plate 10 and preferably, the seat is molded of a metal or fibrous synthetic material and the feet are formed simply as depressions in the seat itself. Two fore and aft guide rails 16, L-shaped in cross-section, are secured to each front and rear pair of feet by means of bolts 17 or the like and cooperate therewith to form channel guideways. The guide rails 16 slidably receive the side edges 10a of the rectangular base plate 10 to restrict the sliding of the seat to fore and aft linear travel.

The seat 14 is positioned selectively along its linear path of movement by engagement of an element thereon with an elongate angle member 18 constituting one element of a seat position lock. The lock angle 18 is secured by any suitable means directly to the top of the base plate 10 so as to lie along the path of travel of one front and rear pair of feet 15. The other element of the seat position lock includes a handle or lever 20 rotatably mounted in some suitable portion of the seat such as an opening 21 through one of the feet. The lever is retained in place journalled in the foot 15 by a washer 22. A torsion spring 23 carried on the shank of the lever 20 is held at opposite ends on the foot 15 and the lever respectively so that the spring urges the handle in a counter clockwise direction as viewed in Fig. 5. Carried at the inner end of the lever 20 is an arm 25 at the end of which protrudes a pin 26 adapted to be received in any of a series of notches 27 in the top edge of the angle member 18. Consequently, in making the fore and aft adjustment, the handle may be raised to lift the arm 25 and remove the pin 26 from engagement with a notch 27. The seat is then moved forward or rearward to any desired location and the handle released until the pin engages and slides into the next adjacent notch 27.

The back rest 30 is secured by any suitable means to upper portions of a pair of upright load supporting posts 31, preferably formed from channel members. A deep notch 32 formed at the lower end of each support member accommodates a fulcrum pin 33 extending from the side of the guideway 16 or other suitable element affixed to the seat 14 to pivotally support the back rest 30 on the seat member 14. The fulcrum pins are capable of supporting downward force against the seat rest but afford no resistance to upward removal of the back rest posts 31. Protruding from the sides of each back rest post are pins 35 carried in blocks 36 secured within a portion of the channel. Each channel post 31 is snugly received between the arms 38 of a spring clip or retainer 39 rigidly secured to the seat. The arms of the clip 39 may be somewhat flexible and slightly divergent to facilitate insertion of the support channels 31 but, are sufficiently rigid to embrace the sides of the channel posts 31 and thereby preclude any appreciable lateral movement of the back rest 30.

Upwardly and forwardly directed extensions 40 on the clip arms 38 form hooks which engage the pins 35 to limit the extent to which the back rest may be pivoted rearwardly about the fulcrum pins 33 and, therefore, the pins 35 and hooks 38 define the inclination of the support posts 31. The hook presents an opening 41 which permits the pins 35 to be completely separated therefrom when the back rest is pivoted slightly forward and then raised from the fulcrum pins 33. Springs 42 on the seat 8 engage the support channel posts 31 to urge the pins 35 rearwardly toward complete engagement with the hooks 40, when there is no load against the back rest. Thus, the fulcrumed association of the back rest 30 and seat 14 and the latch connection 38, 40 provide firm and positive support in use but permit virtually instantaneous separation to facilitate access to the seat in restricted quarters merely by pivoting the back rest forward and raising it from engagement with the fulcrum pin 33 and the latch pins 35.

In Fig. 7 is shown a modified support post clip 50, having a lateral flange 52 engaging one of the support posts 31, so that a pair of such clips snugly embracing the outer sides of each support post 31 will effectively hold the back rest against lateral displacement. Other modifications in the invention illustrated may be made without departing from the spirit and scope of this invention which is defined by the claims appended hereto.

What is claimed as invention is:

1. For use in conjunction with a vehicle having a restricted compartment therein, an adjustable chair for a driver of said vehicle locatable in said compartment and when so located blocking access to said compartment; said chair comprising a base, seat structure attached to said base, and a back rest detachably associated with said seat structure, said back rest being supported above said seat structure and detachably connected thereto by a generally upright supporting post, a fulcrum pin projecting from said seat structure, said post having a downwardly directed notch at its lower end in which said fulcrum pin is received, a retaining pin projecting from said post above said lower end thereof, and a retaining member attached to said seat structure, said member having an upwardly opening hook shaped end engaged with said retaining pin and operatively connecting said post and seat structure together, said back rest and post being completely detachable from said seat structure upon disengagement of said retaining member from said retaining pin by pivoting said post toward said seat structure around said fulcrum pin and thereafter moving said post upwardly out of engagement with said fulcrum pin.

2. The adjustable chair of claim 1 in which spring means is interposed between said back rest supporting post and said seat structure, said spring normally urging said retaining pin on said post into secure interengagement with said hook shaped end of said retaining member.

3. For use in conjunction with a vehicle having a restricted compartment therein, an adjustable chair for a driver of said vehicle locatable in said compartment and when so located blocking access to said compartment; said chair comprising a base, seat structure attached to said base, and a back rest detachably associated with said seat structure, said seat structure with said back rest thereon being slidably adjustable and locatable in one of several predetermined positions relative to said base, and lock means interposed between said seat structure and said base for maintaining said seat structure in one of said positions, said back rest being supported above said seat structure and detachably connected thereto by a generally upright supporting post, a fulcrum pin projecting from said seat structure, said post having a downwardly directed notch at its lower end in which said fulcrum pin is received, a retaining pin projecting from said post above said lower end thereof, and a retaining member attached to said seat structure, said member having an upwardly opening hook shaped end engaged with said retaining pin and operatively connecting said post and seat together, said back rest and post being completely detachable from said seat and base upon disengagement of said retaining member from said retaining pin by pivoting said post toward said seat structure around said fulcrum pin and thereafter moving said post upwardly out of engagement with said fulcrum pin.

4. In combination with a vehicle which includes a driver's compartment and a restricted passageway leading into said compartment, an adjustable chair for a vehicle driver located in said passageway and blocking access to said compartment, said chair comprising a supporting column extending generally upright in said passageway, a chair base attached to said column, seat structure attached to said base, and a back rest detachably associated with said seat structure, said back rest being supported above said seat structure and detachably connected thereto by a generally upright supporting post, a fulcrum pin projecting from said seat structure, said post having a downwardly directed notch at its lower end in which said fulcrum pin is received, a retaining pin projecting laterally from said post above said post lower end, a retaining member attached to said seat structure, said member having an upwardly directed hook-shaped end engaged with said retaining pin and operatively connecting together said post and seat structure, and spring means interposed between said post and said seat structure and normally urging said retaining pin into engagement with said retaining member end, said back rest and post being completely detachable from said seat structure and base to permit access to said compartment through said restricted passageway upon disengagement of said retaining member from said retaining pin by pivoting said post toward said seat structure around said fulcrum pin against the urging effects of said spring means and thereafter moving said post upwardly out of engagement with said fulcrum pin.

5. The combination of claim 4 in which said seat structure and back rest are slidably adjustable in unison relative to said base, and in which releasable lock means is interposed between said seat structure and said base for maintaining said seat structure in one of several predetermined positions relative to said base.

6. The combination of claim 4 in which means is provided between said column and said chair base permitting selective vertical sliding adjustment of said base and said seat structure therewith relative to the floor of said restricted passageway.

References Cited in the file of this patent

UNITED STATES PATENTS

| | | |
|---|---|---|
| 984,709 | Ruggles | Feb. 21, 1911 |
| 1,829,434 | Bair | Oct. 27, 1931 |